United States Patent
Garg et al.

(10) Patent No.: US 12,002,142 B2
(45) Date of Patent: Jun. 4, 2024

(54) PERFORMANCE OVERHEAD OPTIMIZATION IN GPU SCOPING

(71) Applicant: QUALCOMM Incorporated, San Diego, CA (US)

(72) Inventors: Tushar Garg, Bangalore (IN); Thomas Edwin Frisinger, Shrewsbury, MA (US); Nigel Poole, West Newton, MA (US); Vishwanath Shashikant Nikam, Bangalore (IN); Vijay Kumar Donthireddy, Bengaluru (IN)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/373,718

(22) Filed: Jul. 12, 2021

(65) Prior Publication Data
US 2023/0009205 A1    Jan. 12, 2023

(51) Int. Cl.
*G06T 15/00* (2011.01)
*G06F 11/34* (2006.01)
*G06T 1/20* (2006.01)

(52) U.S. Cl.
CPC ........ *G06T 15/005* (2013.01); *G06F 11/3485* (2013.01); *G06T 1/20* (2013.01)

(58) Field of Classification Search
CPC ...... G06T 15/005; G06T 1/20; G06F 11/3485
See application file for complete search history.

(56) References Cited

U.S. PATENT DOCUMENTS

| | | | |
|---|---|---|---|
| 8,890,880 B2 | 11/2014 | Liu et al. | |
| 9,594,599 B1* | 3/2017 | Johnson | G06F 9/5083 |
| 10,748,239 B1 | 8/2020 | Poole et al. | |
| 2013/0265307 A1 | 10/2013 | Goel et al. | |
| 2014/0089699 A1 | 3/2014 | O'Connor et al. | |
| 2014/0168231 A1* | 6/2014 | Allen | G06T 1/20 345/506 |
| 2015/0052410 A1* | 2/2015 | Hyun | G01R 31/318575 714/727 |
| 2016/0041775 A1* | 2/2016 | Hanson | G06F 11/3423 711/169 |

(Continued)

OTHER PUBLICATIONS

International Search Report and Written Opinion—PCT/US2022/033532—ISA/EPO—Sep. 23, 2022.

*Primary Examiner* — Sing-Wai Wu
*Assistant Examiner* — Khoa Vu
(74) *Attorney, Agent, or Firm* — QUALCOMM Incorporated

(57) ABSTRACT

The present disclosure relates to methods and devices for graphics processing including an apparatus, e.g., a GPU. The apparatus may process a first workload of a plurality of workloads at each of multiple clusters in a GPU pipeline. The apparatus may also increment a plurality of performance counters during the processing of the first workload at each of the multiple clusters. Further, the apparatus may determine, at each of the multiple clusters, whether the first workload is finished processing. The apparatus may also read, upon determining that the first workload is finished processing, a value of each of the multiple clusters for each of the plurality of performance counters. Additionally, the apparatus may transmit an indication of the read value of each of the multiple clusters for all of the plurality of performance counters.

26 Claims, 12 Drawing Sheets

(56) References Cited

U.S. PATENT DOCUMENTS

| | | | |
|---|---|---|---|
| 2017/0090955 A1* | 3/2017 | Hsiao | G06F 9/542 |
| 2018/0349191 A1* | 12/2018 | Dorsey | G06F 9/4856 |
| 2019/0213706 A1 | 7/2019 | Goldman et al. | |
| 2019/0213775 A1* | 7/2019 | Dimitrov | G06N 3/08 |
| 2020/0311859 A1 | 10/2020 | Du et al. | |
| 2022/0035679 A1* | 2/2022 | Sunwoo | G06N 5/04 |
| 2022/0035684 A1* | 2/2022 | Gupte | G06F 9/5083 |
| 2022/0156874 A1* | 5/2022 | Acharya | G06T 15/00 |

* cited by examiner

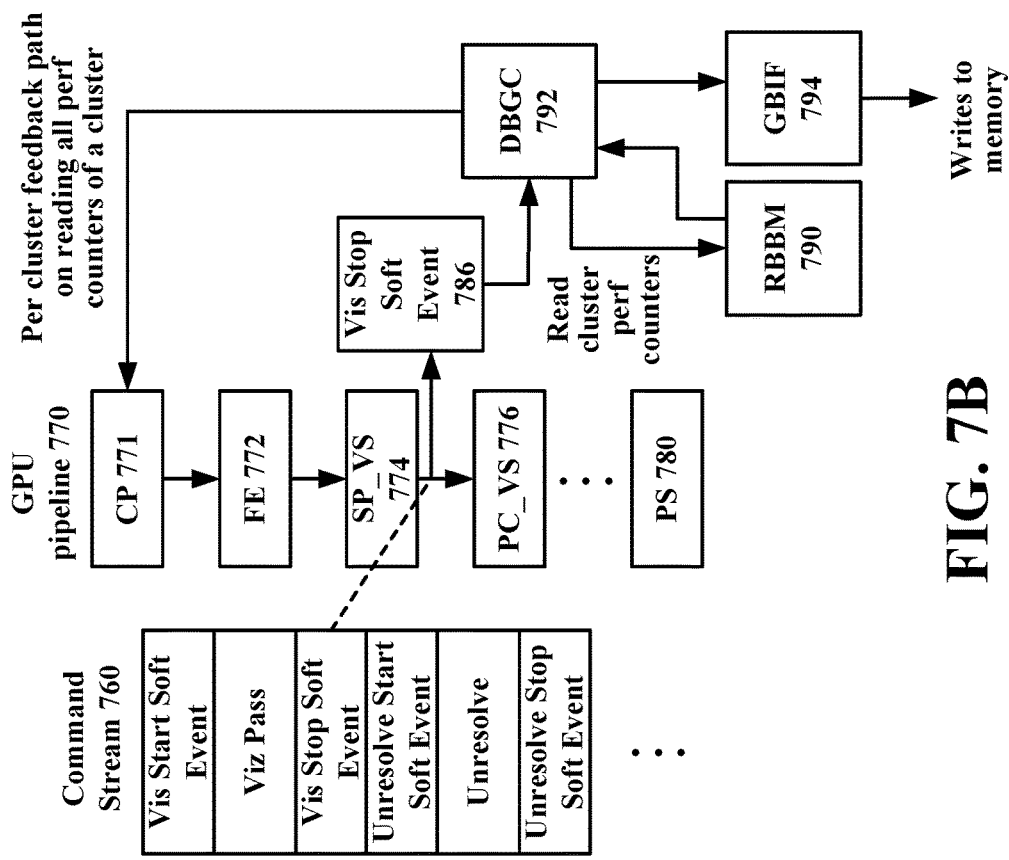
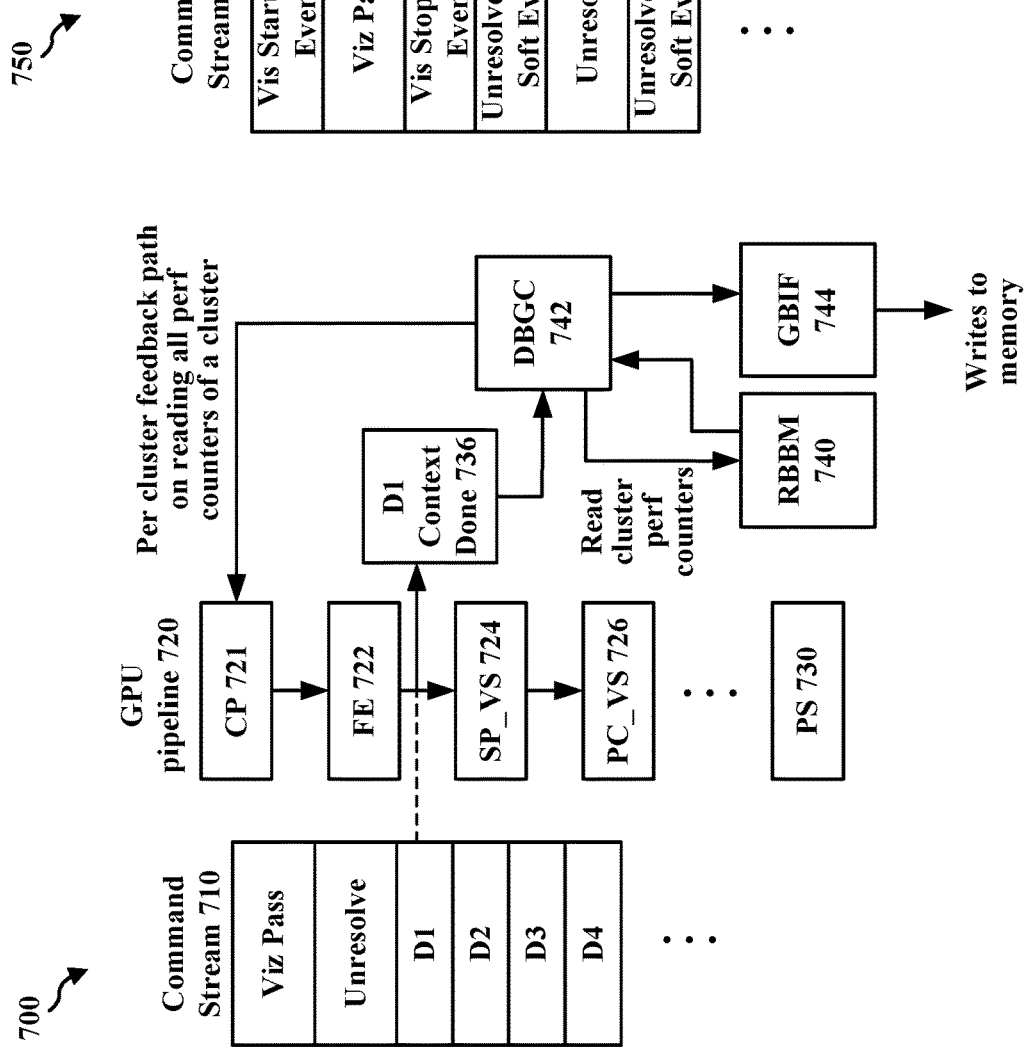
FIG. 7B
FIG. 7A

PERFORMANCE OVERHEAD OPTIMIZATION IN GPU SCOPING

TECHNICAL FIELD

The present disclosure relates generally to processing systems and, more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved graphics or display processing.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a graphics processing unit (GPU) or any apparatus that can perform graphics processing. The apparatus may receive a first workload of a plurality of workloads at each of multiple clusters, where the first workload is processed at each of the multiple clusters after the first workload is received. The apparatus may also process a first workload of a plurality of workloads at each of multiple clusters in a graphics processing unit (GPU) pipeline. Additionally, the apparatus may increment a plurality of performance counters during the processing of the first workload at each of the multiple clusters. The apparatus may also determine, at each of the multiple clusters, whether the first workload is finished processing. The apparatus may also transmit, upon determining the first workload is finished processing at one cluster of the multiple clusters, the first workload from the one cluster of the multiple clusters to a subsequent cluster of the multiple clusters. Moreover, the apparatus may transmit, upon finishing processing the first workload at each of the multiple clusters, an indication that the first workload is finished processing from each of the multiple clusters to a debug controller (DBGC). The apparatus may also read, upon determining that the first workload is finished processing, a value of each of the multiple clusters for each of the plurality of performance counters. The apparatus may also store, in a memory or a buffer, the value of each of the multiple clusters for each of the plurality of performance counters after reading the value of each of the multiple clusters. Further, the apparatus may transmit an indication of the read value of each of the multiple clusters for all of the plurality of performance counters. The apparatus may also process a second workload of the plurality of workloads at each of the multiple clusters when, for the first workload, the reading of the plurality of performance counters is completed for each of the multiple clusters.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 7A illustrates a diagram of example performance counter scoping in accordance with one or more techniques of this disclosure.

FIG. 7B illustrates a diagram of example performance counter scoping in accordance with one or more techniques of this disclosure.

DETAILED DESCRIPTION

Figure 1:
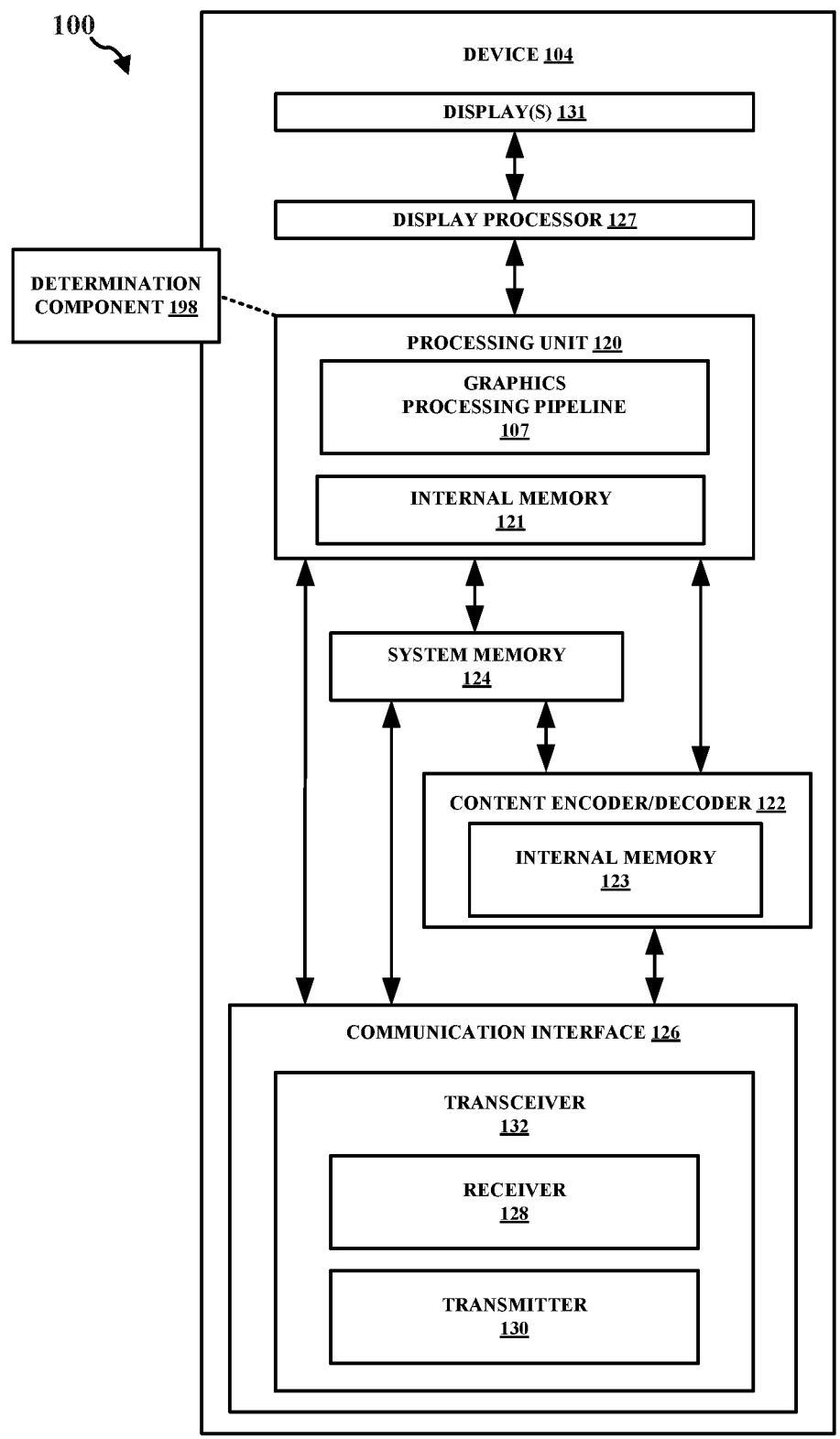
FIG. 1 is a block diagram that illustrates an example content generation system in accordance with one or more techniques of this disclosure.

Some aspects of graphics processing may utilize GPU scoping by reading different performance counters in a GPU pipeline at defined workload boundaries. In some aspects of GPU scoping, the aforementioned performance counters may be placed in blocks of a GPU pipeline and may be used to calculate a number of different operations for each workload, e.g., the total processing time of a workload, in a particular block. In some instances, it may be necessary to capture these performance counters at each stage of the GPU pipeline. In some modes of a GPU, e.g., a normal mission mode, multiple batches of workloads may be sent to the GPU pipeline, which may result in multiple workloads co-existing in the GPU pipeline simultaneously, e.g., in a pipelined fashion. With GPU pipeline blocks working on multiple batches of workloads, it may be difficult to obtain the performance metrics per drawcall or per stage accurately for a single workload without limiting to one workload (i.e., drawcall or stage) at a time in the GPU pipeline. For instance, limiting to one drawcall or stage at a time in the GPU pipeline may be achieved by introducing a wait-for-idle (WFI) mechanism in the command stream after each drawcall or stage. However, this may add a large overhead in terms of performance, as a complete GPU pipeline may need to finish one workload (i.e., drawcall or stage) and become idle, after which the next workload may be sent to the GPU pipeline. Aspects of the present disclosure may accurately capture the performance counters from GPU sub-blocks for a workload without any mixing of two or more workloads. Aspects of the present disclosure may allow this to occur while allowing multiple workloads to be present in the GPU pipeline at a time. Moreover, aspects of the present disclosure may reduce the overhead in performance, while capturing the performance counters at workload boundaries, with multiple workloads being executed in the GPU pipeline. Aspects of the present disclosure may allow this to occur without any WFI mechanisms being inserted into the command stream after each workload. Additionally, aspects of the present disclosure may reduce the performance overhead while scoping the performance counters at workload (i.e., drawcall or stage) boundaries. In some instances, a GPU block may be allowed to work on a single workload batch at a time and a next batch may be back pressured until the current workload is finished and its performance counters are sent to a memory at a workload boundary. This may be achieved by dividing the GPU hardware pipeline into multiple clusters, such that all of the clusters may be working on separate batches of work, where one workload or batch may be active in a cluster at a time.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a determination component 198 configured to receive the first workload of the plurality of workloads at each of the multiple clusters, where the first workload is processed at each of the multiple clusters after the first workload is received. The determination component 198 may also be configured to process a first workload of a plurality of workloads at each of multiple clusters in a graphics processing unit (GPU) pipeline. The determination component 198 may also be configured to increment a plurality of performance counters during the processing of the first workload at each of the multiple clusters. The determination component 198 may also be configured to determine, at each of the multiple clusters, whether the first workload is finished processing. The determination component 198 may also be configured to transmit, upon determining the first workload is finished processing at one cluster of the multiple clusters, the first workload from the one cluster of the multiple clusters to a subsequent cluster of the multiple clusters. The determination component 198 may also be configured to transmit, upon finishing processing the first workload at each of the multiple clusters, an indication that the first workload is finished processing from each of the multiple clusters to a debug controller (DBGC). The determination component 198 may also be configured to read, upon determining that the first workload is finished processing, a value of each of the multiple clusters for each of the plurality of performance counters. The determination component 198 may also be configured to store, in a memory or a buffer, the value of each of the multiple clusters for each of the plurality of performance counters after reading the value of each of the multiple clusters. The determination component 198 may also be configured to transmit an indication of the read value of each of the multiple clusters for all of the plurality of performance counters. The determination component 198 may also be configured to process a second workload of the plurality of workloads at each of the multiple clusters when, for the first workload, the reading of the plurality of performance counters is completed for each of the multiple clusters. Although the following description may be focused on graphics processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
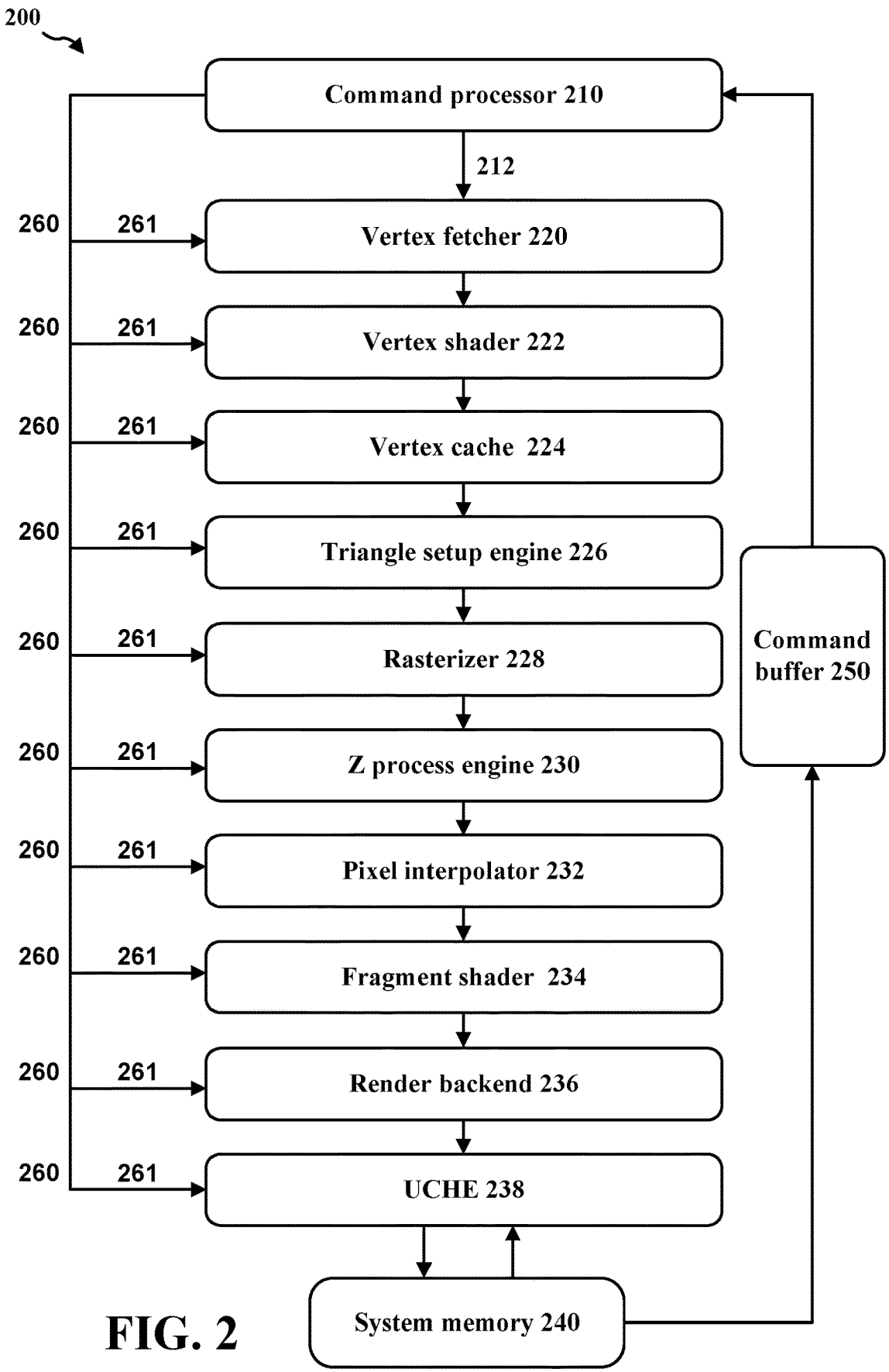
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 2 (L2) cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1.

GPUs can render images in a variety of different ways. In some instances, GPUs can render an image using rendering and/or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects, during a binning pass, an image can be divided into different bins or tiles. In some aspects, during the binning pass, a visibility stream can be constructed where visible primitives or draw calls can be identified. In contrast to tiled rendering, direct rendering does not divide the frame into smaller bins or tiles. Rather, in direct rendering, the entire frame is rendered at a single time. Additionally, some types of GPUs can allow for both tiled rendering and direct rendering.

In some aspects, GPUs can apply the drawing or rendering process to different bins or tiles. For instance, a GPU can render to one bin, and perform all of the draws for the primitives or pixels in the bin. During the process of rendering to a bin, the render targets can be located in the GMEM. In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitive in each bin or area, e.g., in a system memory. This visibility information can be used to determine or generate a visibility stream. In a rendering pass, the primitives in each bin can be rendered separately. In these instances, the visibility stream can be fetched from memory used to drop primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

Figure 3:
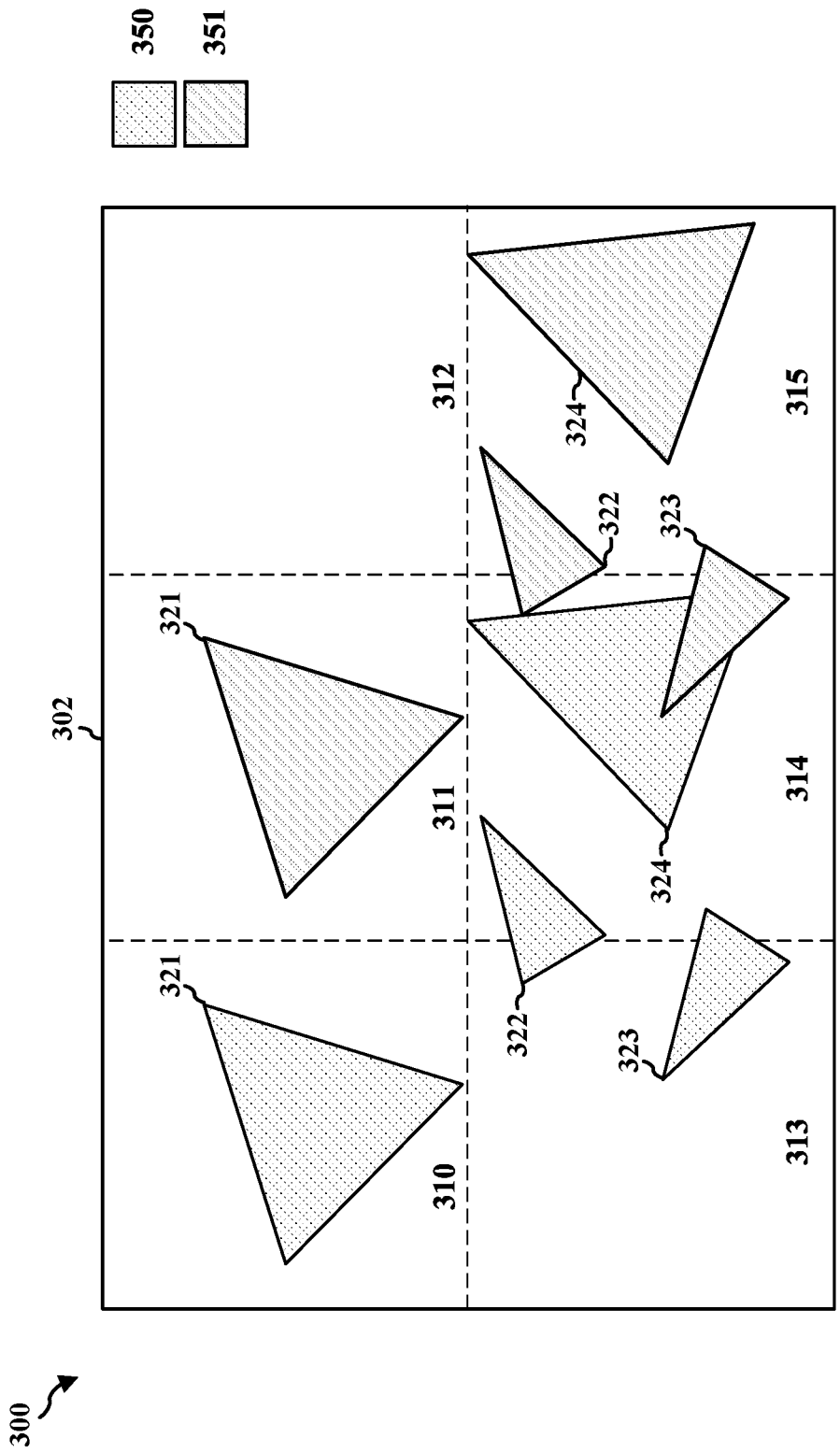
FIG. 3 illustrates an example image or surface in accordance with one or more techniques of this disclosure.

FIG. 3 illustrates image or surface 300, including multiple primitives divided into multiple bins. As shown in FIG. 3, image or surface 300 includes area 302, which includes primitives 321, 322, 323, and 324. The primitives 321, 322, 323, and 324 are divided or placed into different bins, e.g., bins 310, 311, 312, 313, 314, and 315. FIG. 3 illustrates an example of tiled rendering using multiple viewpoints for the primitives 321-324. For instance, primitives 321-324 are in first viewpoint 350 and second viewpoint 351. As such, the GPU processing or rendering the image or surface 300 including area 302 can utilize multiple viewpoints or multi-view rendering.

As indicated herein, GPUs or graphics processor units can use a tiled rendering architecture to reduce power consumption or save memory bandwidth. As further stated above, this rendering method can divide the scene into multiple bins, as well as include a visibility pass that identifies the triangles that are visible in each bin. Thus, in tiled rendering, a full screen can be divided into multiple bins or tiles. The scene can then be rendered multiple times, e.g., one or more times for each bin. In aspects of graphics rendering, some graphics applications may render to a single target, i.e., a render target, one or more times. For instance, in graphics rendering, a frame buffer on a system memory may be updated multiple times. The frame buffer can be a portion of memory or random access memory (RAM), e.g., containing a bitmap or storage, to help store display data for a GPU. The frame buffer can also be a memory buffer containing a complete frame of data. Additionally, the frame buffer can be a logic buffer. In some aspects, updating the frame buffer can be performed in bin or tile rendering, where, as discussed above, a surface is divided into multiple bins or tiles and then each bin or tile can be separately rendered. Further, in tiled rendering, the frame buffer can be partitioned into multiple bins or tiles.

Some aspects of graphics processing may utilize GPU scoping. For instance, GPU scoping may be performed by reading different performance counters in a GPU pipeline at defined workload boundaries. In some aspects of GPU scoping, the performance of the GPU may be calculated for different workloads and applications. Batches of workloads may be various sizes, such as the size of a single drawcall or the size of a complete pass or stage. In reference to tiled rendering architecture, these workloads may also correspond to a complete binning pass or a complete rendering pass.

In some aspects of GPU scoping, the aforementioned performance counters may be placed in blocks of a GPU pipeline and may be used to calculate a number of different operations for each workload, e.g., the total processing time of a workload, in a particular block. Additionally, performance counters for each stage of the GPU pipeline may correspond to a particular GPU architecture. In some instances, it may be necessary to capture these performance counters at each stage of the GPU pipeline. Also, it may be necessary to individually capture the timing for each pass and drawcall at each stage of the GPU pipeline.

Figure 4:
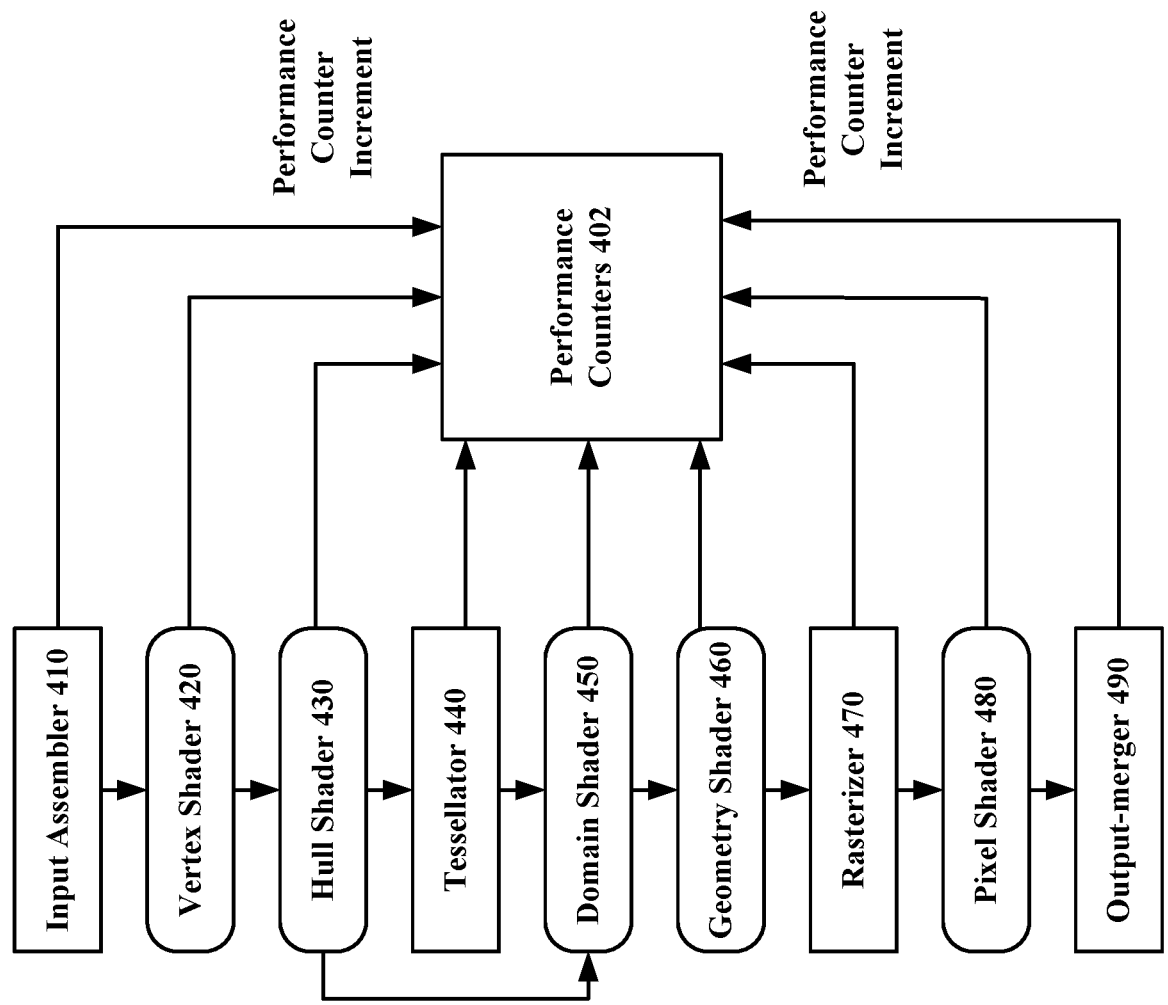
FIG. 4 is a diagram illustrating an example GPU pipeline and performance counters in accordance with one or more techniques of this disclosure.

FIG. 4 is a diagram 400 illustrating an example GPU pipeline and performance counters 402. As shown in FIG. 4, diagram 400 includes input assembler 410, vertex shader 420, hull shader 430, and tessellator 440. Diagram 400 also includes domain shader 450, geometry shader 460, rasterizer 470, pixel shader 480, and output-merger 490. As depicted in FIG. 4, each of these components in diagram 400 may be connected to performance counters 402. For instance, each of the components 410-490 may increment the performance counters 402 based on processing at the components.

In some modes of a GPU, e.g., a normal mission mode, multiple batches of workloads may be sent to the GPU pipeline, which may result in multiple workloads co-existing in the GPU pipeline simultaneously, e.g., in a pipelined fashion. With GPU pipeline blocks working on multiple batches of workloads, it may be difficult to accurately obtain the performance metrics per drawcall or per stage for a single workload without limiting to one workload (i.e., drawcall or stage) at a time in the GPU pipeline. For instance, limiting to one drawcall or stage at a time in the GPU pipeline may be achieved by introducing a wait-for-idle (WFI) mechanism in the command stream after each drawcall or stage. However, this may add a large overhead in terms of performance, as a complete GPU pipeline may need to finish one workload (i.e., drawcall or stage) and become idle, after which the next workload may be sent to the GPU pipeline.

Figure 5:
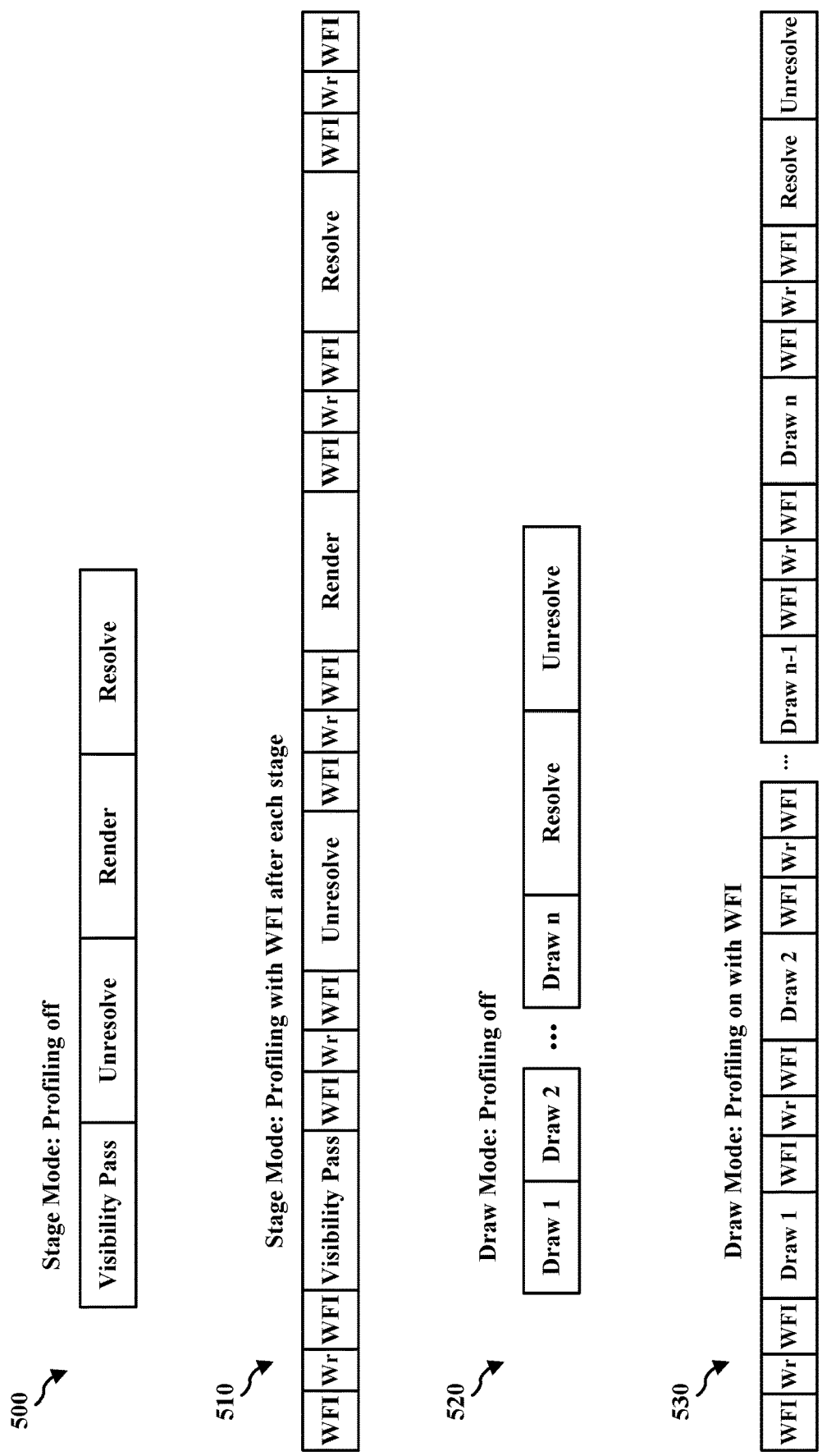
FIG. 5 is a diagram illustrating example profiling for different modes of a GPU in accordance with one or more techniques of this disclosure.

FIG. 5 illustrates diagrams 500, 510, 520, and 530, respectively, of profiling for different modes at a GPU. For instance, diagrams 500 and 510 correspond to a stage mode at a GPU and diagrams 520 and 530 correspond to a draw mode at a GPU. As shown in FIG. 5, diagram 500 includes a visibility pass, an unresolve portion, a render portion, and a resolve portion. Diagram 500 corresponds to a stage mode with profiling off. As illustrated in FIG. 5, diagram 510 includes a visibility pass, an unresolve portion, a render portion, and a resolve portion. Diagram 510 also includes a wait-for-idle (WFI) mechanism and a writing (Wr) of performance counters into memory. More specifically, "Wr" denotes the overhead due to the writing of performance counters into memory. Diagram 510 corresponds to a stage mode profiling with WFI after each stage.

As further shown in FIG. 5, diagram 520 includes a number of draws, e.g., draw 1, draw 2, . . . , draw n, as well as a resolve portion and an unresolve portion. Diagram 520 corresponds to a draw mode with profiling off. As depicted in FIG. 5, diagram 530 also includes number of draws, e.g., draw 1, draw 2, . . . , draw n, as well as a resolve portion and an unresolve portion. Diagram 530 also includes a WFI mechanism and Wr (the overhead due to the writing of performance counters into memory). Diagram 530 corresponds to a draw mode and profiling on with WFI. FIG. 5 depicts the overhead added due to the introduction of a GPU WFI mechanism after every workload. Also, the overhead may be increased due to expensive WFI mechanisms inserted in the command stream.

Based on the above, it may be beneficial to accurately capture the performance counters from GPU sub-blocks for a workload without any mixing of two or more workloads. It may be beneficial for this to occur while allowing multiple workloads to be present in the GPU pipeline at a time. Further, it may be beneficial to reduce the overhead in performance, while capturing the performance counters at workload boundaries, with multiple workloads being executed in the GPU pipeline. It may also be beneficial for this to occur without any wait-for-idle (WFI) mechanisms being inserted into the command stream after each workload.

Aspects of the present disclosure may accurately capture the performance counters from GPU sub-blocks for a workload without any mixing of two or more workloads. Aspects of the present disclosure may allow this to occur while allowing multiple workloads to be present in the GPU pipeline at a time. Moreover, aspects of the present disclosure may reduce the overhead in performance, while capturing the performance counters at workload boundaries, with multiple workloads being executed in the GPU pipeline. Aspects of the present disclosure may allow this to occur without any WFI mechanisms being inserted into the command stream after each workload.

Additionally, aspects of the present disclosure may reduce the performance overhead while scoping the performance counters at workload (i.e., drawcall or stage) boundaries. In some instances, a GPU block may be allowed to work on a single workload batch at a time and a next batch may be back pressured until the current workload is finished and its performance counters are sent to a memory at a workload boundary. This may be achieved by dividing the GPU hardware pipeline into multiple clusters, such that all of the clusters may be working on separate batches or workloads, where one workload or batch may be active in a cluster at a time.

Figure 6:
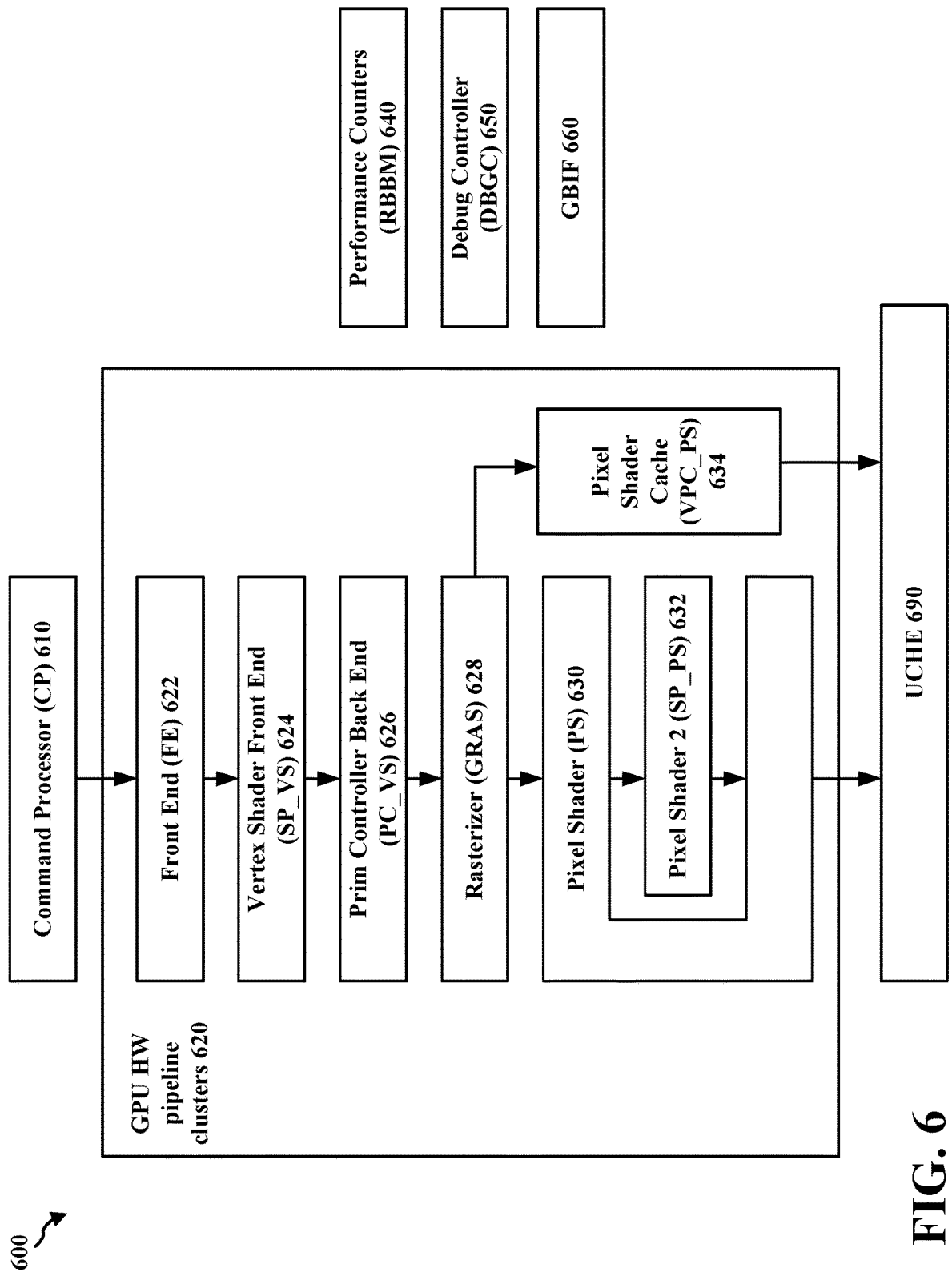
FIG. 6 is a diagram illustrating an example hardware clusters in a GPU in accordance with one or more techniques of this disclosure.

FIG. 6 is a diagram 600 illustrating example hardware clusters in a GPU. As shown in FIG. 6, diagram 600 includes command processor (CP) 610 and GPU hardware (HW) pipeline clusters 620 including front end (FE) 622, vertex shader front end (SP_VS) 624, primitive controller back end (PC_VS) 626, rasterizer (GRAS) 628, pixel shader (PS) 630, pixel shader 2 (SP_PS) 632 and pixel shader cache (VPC_PS) 634. Diagram 600 also includes performance counters (i.e., register backbone management (RBBM)) 640, debug controller (DBGC) 650, general buffer interface (GBIF) 660, and UCHE 690. FIG. 6 depicts different hardware clusters 620 into which the GPU pipeline is divided in a GPU architecture. In some instances, the upstream clusters may be back-pressured by downstream cluster blocks if downstream cluster blocks are not able to make any progress. These clusters 620 may be a group of GPU blocks or a single GPU block. Aspects of the present disclosure may reuse these sets of clusters 620.

Aspects of the present disclosure may devise a mechanism to back-pressure the GPU hardware pipeline's next batch in a cluster, such as over the time that the performance counters of all blocks in that cluster are not read out and sent to a memory interface for a current batch. In order to do so, aspects of the present disclosure may include a number of different steps or features. For instance, aspects of the present disclosure may include a driver to provide a clear breakpoint in the command stream between two workloads, for which it may need to scope the performance. These breakpoints may be global events inserted after each drawcall or stage. These global events may already be existing context-done for drawcalls and may be newly introduced soft-events for stages. Additionally, the workloads may be drawcalls, as well as different types of stages, e.g., visibility pass, resolve pass, etc.

In aspects of the present disclosure, a single batch per cluster may be allowed by a command processor (CP) to be executed at one time. For this time, all blocks in a cluster may not have completed a batch and a debug controller (DBGC) may not have read out the performance counters of these blocks from a register backbone management (RBBM). Also, the CP may not send the next batch programming to that cluster's blocks. GPU blocks may not start on a next batch execution until the complete programming is received by that block from the CP.

After finishing the workload, each block in the GPU hardware pipeline may send a copy of the global event at the end of a workload (e.g., context-done for drawcalls and soft-events for stages) to the DBGC indicating that a workload batch is completed by this block and the DBGC may start reading performance counters associated with this block from the RBBM. The DBGC may make use of its existing trace buffer to buffer up the performance counters read from the RBBM for a block before sending them to a memory interface or to a trace bus. After the DBGC reads all the performance counters associated with a block from the RBBM, it may send an indication to the CP, which states the DBGC completed reading all the performance counters for a respective block in a cluster. After the CP receives an indication for all blocks in a cluster from the DBGC, it may unblock the next batch of programming for that cluster of blocks. This may continually occur for all batches.

FIGS. 7A and 7B illustrate diagrams 700 and 750, respectively, of a performance counter scoping process. As shown in FIG. 7A, diagram 700 includes command stream 710 including visibility pass, unresolve portion, and D1-D4. Diagram 700 also includes GPU pipeline 720 including CP 721, FE 722, SP_VS 724, PC_VS, 726, and PS 730. Also, diagram 700 includes D1 context done 736, RBBM 740, DBGC 742, and GBIF 744. As depicted in FIG. 7A, DBGC 742 may include a per cluster feedback path to CP 721 on reading all performance counters of a cluster. Also, DBGC 742 may read cluster performance counters to RBBM 740. Moreover, GBIF 744 may write to memory. FIG. 7A shows the command stream 710 sends different types of workloads, e.g., drawcalls and stages. At the boundary of these workloads, global events like context-done for drawcalls are inserted by the CP 721 and soft events indicating the start or stop of a stage are inserted by the driver.

As shown in FIG. 7B, diagram 750 includes command stream 760 including visibility pass, visibility start soft event, visibility stop soft event, unresolve portion, unresolve start soft event, and unresolve stop soft event. Diagram 750 also includes GPU pipeline 770 including CP 771, FE 772, SP_VS 774, PC_VS 776, and PS 780. Further, diagram 750 includes visibility stop soft event 786, RBBM 790, DBGC 792, and GBIF 794. As depicted in FIG. 7B, DBGC 792 may include a per cluster feedback path to CP 771 on reading all performance counters of a cluster. DBGC 792 may also read cluster performance counters to RBBM 790. Additionally, GBIF 794 may write to memory. FIG. 7B shows the command stream 760 sends different types of workloads, e.g., drawcalls and stages. Also, at the boundary of these workloads, global events like context-done for drawcalls are inserted by the CP 771 and soft events indicating the start or stop of a stage are inserted by the driver.

In some aspects, performance counter scoping using a DBGC and a CP may stall the GPU cluster's programming to back-pressure the pipeline over the time that all performance counters of a cluster are not read from a RBBM by a DBGC and sent to a memory interface (MIF) or stored in its trace buffer. In aspects of the present disclosure, the command processor (CP) may ensure that a single workload programming (i.e., batch) is sent to a GPU cluster at a time, while the next batch is throttled inside the CP for that cluster until the first batch is finished. This may be referred to as a single batch per cluster. Once a block in a cluster finishes a batch, it may wait for the CP to program a next batch programming. Once programmed with the next batch, it may start working on the next batch until programmed with the next batch programming, and may continue to wait while back-pressuring the upstream pipeline. Clusters may pass on the data for a current batch on a data path to subsequent clusters in the pipeline. The next cluster may start working on that batch, if it has received a complete programming of the batch from the CP. For example, if there are seven (7) clusters in the GPU pipeline (e.g., cluster 0 to cluster 6), cluster 0 may be working on batch 6, cluster 1 may be working on batch 5, etc., and cluster 6 may be working on batch 0. In this manner, each cluster may be working on a separate batch of a workload, which may allow multiple batches of a workload to be executed simultaneously in the GPU pipeline. By doing so, the upstream clusters in the pipeline may work on the most recent batch, while downstream clusters may work on older batches.

In some aspects, the performance counters for all blocks may be sent to a memory interface using a debug block inside a GPU called a debug controller (DBGC). At the end of a workload, the CP may send a pipeline event, such as a context-done at the end of a drawcall or a software defined soft-event at the end of a stage. These events may be sent down the pipeline from one GPU block to a next GPU block upon completion of a workload. The DBGC may receive a copy of these pipeline events from all GPU pipeline blocks. After the DBGC receives this event copy at the end of a workload from a block, it may start reading the performance counters of that block and send them to a memory interface. After reading all performance counters of all blocks in a cluster, the DBGC may send an indication that the performance counters reading is completed to the CP for that cluster.

After the CP receives this indication from the DBGC for a cluster, it may unblock the next batch programming for that cluster. In this architecture, the CP may block the last part of programming of a batch, i.e., the programming end. Without receiving the programming end, blocks may not start working on the new programming. As such, in effect the CP may be blocking a single register write for a block, e.g., the last register write, while maintaining a single batch per cluster. Thus, the overhead of sending the next batch programming may be negligible. The aforementioned approach of the present disclosure, e.g., dividing the GPU pipeline into multiple clusters and allowing all clusters to work independently on separate single batches at a time, may allow multiple batches to be worked on in a GPU pipeline, as compared to one batch in a complete GPU pipeline with a traditional approach of a command stream wait-for-idle (WFI) mechanism. As indicated herein, this may provide a reduction in the overall performance overhead.

Figure 8:
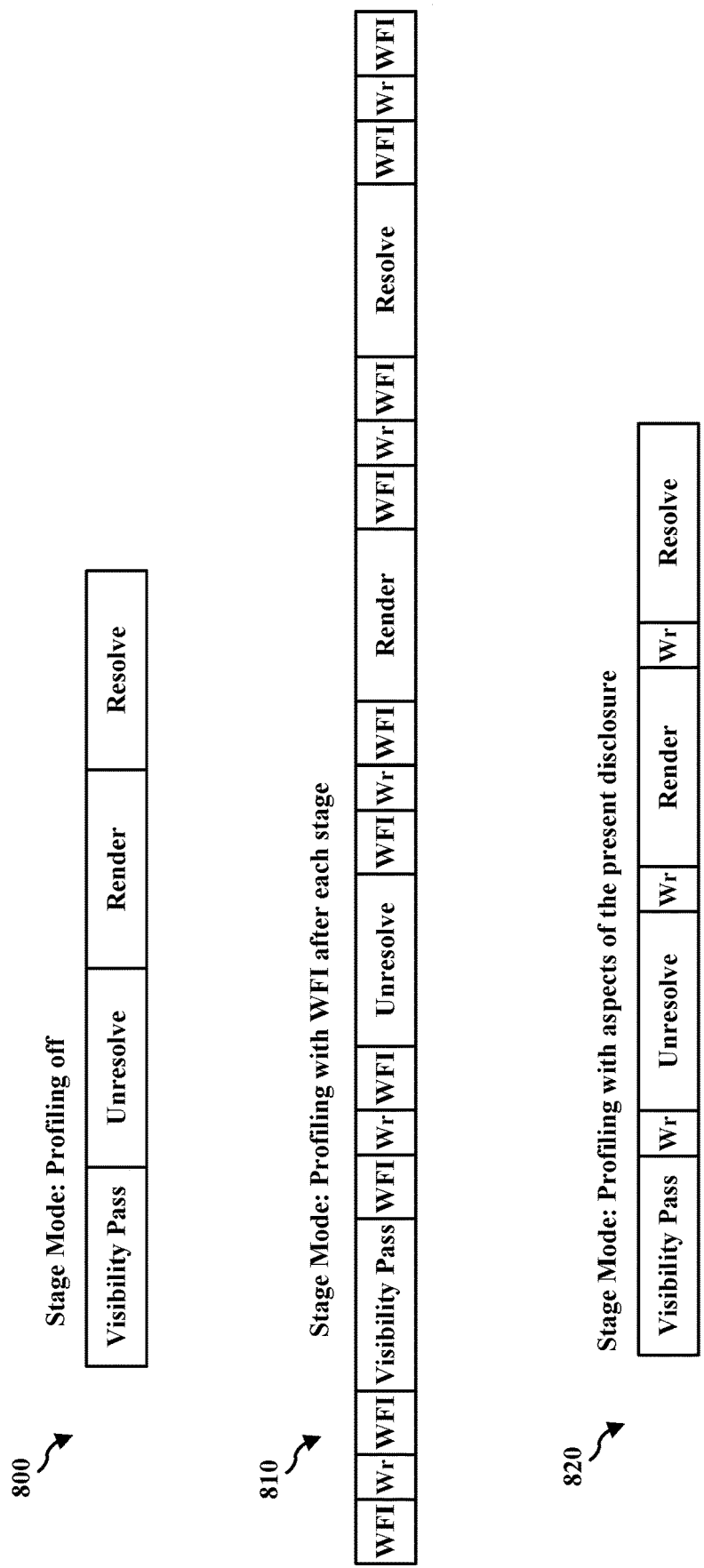
FIG. 8 is a diagram illustrating example profiling for different modes of a GPU in accordance with one or more techniques of this disclosure.
Figure 9:
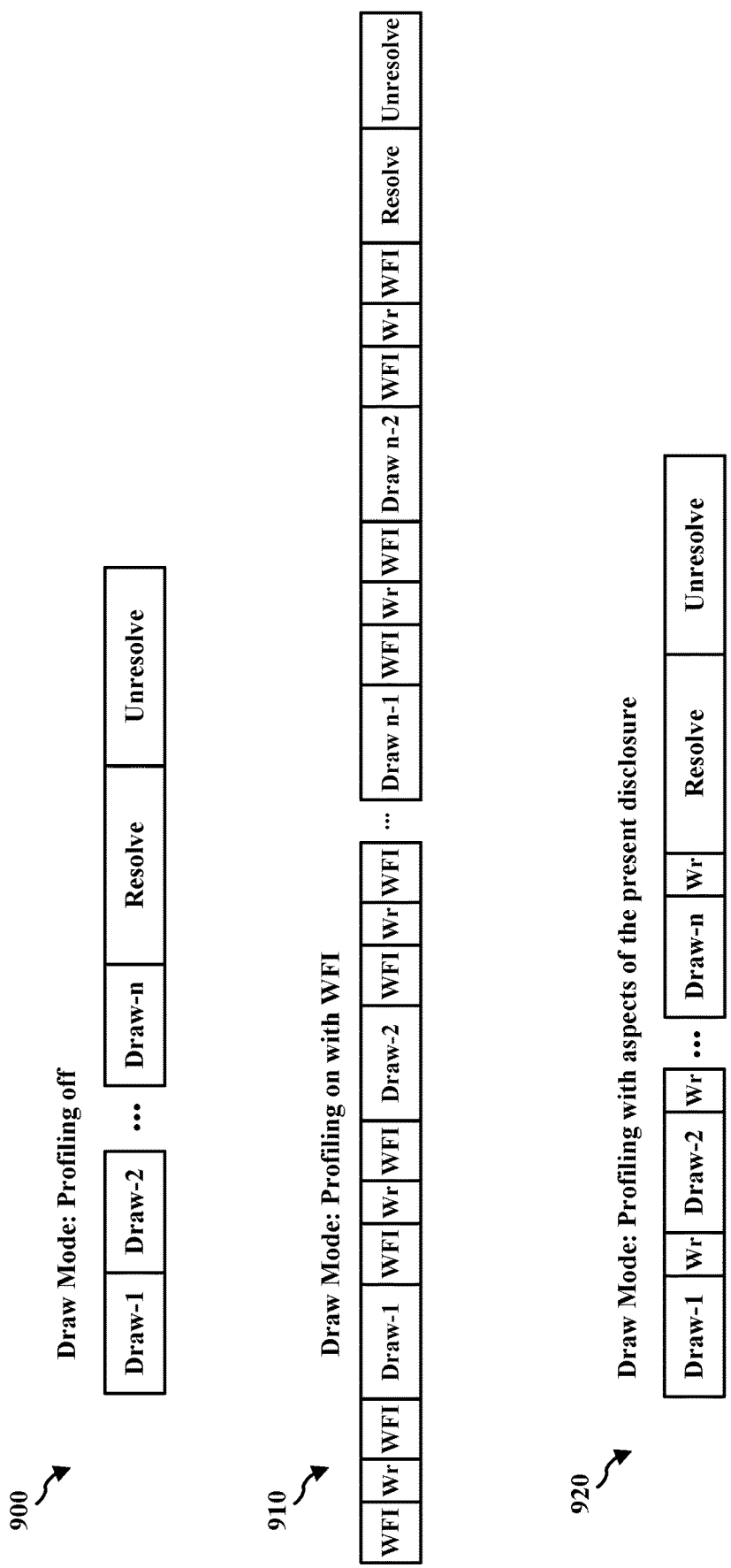
FIG. 9 is a diagram illustrating example profiling for different modes of a GPU in accordance with one or more techniques of this disclosure.

FIGS. 8 and 9 illustrate diagrams 800-820 and 900-920, respectively, of profiling for different GPU modes, e.g., stage mode and draw mode profiling. For instance, diagrams 800, 810, and 820 in FIG. 8 correspond to stage mode profiling at a GPU and diagrams 900, 910, and 920 in FIG. 9 correspond to draw mode profiling at a GPU. As shown in FIG. 8, diagram 800 includes a visibility pass, an unresolve portion, a render portion, and a resolve portion. Diagram 800 corresponds to a stage mode with profiling off. As illustrated in FIG. 8, diagram 810 includes a visibility pass, an unresolve portion, a render portion, and a resolve portion. Diagram 810 also includes a wait-for-idle (WFI) mechanism and a writing (Wr) of performance counters into memory. As indicated previously, "Wr" denotes the overhead due to the writing of performance counters into memory. Diagram 810 corresponds to a stage mode profiling with WFI after each stage. Diagram 820 includes a visibility pass, an unresolve portion, a render portion, and a resolve portion, as well as a "Wr" portion between each portion to denote the overhead due to the writing of performance counters into memory. Diagram 820 corresponds to a stage mode profiling with aspects of the present disclosure.

As shown in FIG. 9, diagram 900 includes a number of different draws, e.g., draw 1, draw 2, . . . , draw n, as well as a resolve portion and an unresolve portion. Diagram 900 corresponds to a draw mode with profiling off. As depicted in FIG. 9, diagram 910 also includes number of draws, e.g., draw 1, draw 2, . . . , draw n, as well as a resolve portion and an unresolve portion. Diagram 910 also includes a WFI mechanism and Wr (the overhead due to the writing of performance counters into memory). Diagram 910 corresponds to a draw mode and profiling on with WFI. Diagram 920 includes a number of draws (e.g., draw 1, draw 2, . . . , draw n), a resolve portion, and an unresolve portion, as well as a "Wr" portion between each portion to denote the overhead due to the writing of performance counters into memory. Diagram 920 corresponds to a draw mode and profiling with aspects of the present disclosure.

FIGS. 8 and 9 show that utilizing aspects of the present disclosure results in a reduction in overhead while profiling the GPU performance counters using a scope application. As depicted in FIG. 8, in stage mode, the overhead may be reduced to less than 10% when using aspects of the present disclosure, as compared to more than 100% overhead in some cases when using older WFI insertion mechanisms. As shown in FIG. 9, in draw mode, the gains may be even higher when using aspects of the present disclosure. For example, utilizing aspects of the present disclosure may reduce the overhead to less than 10% compared to other use cases.

Figure 10:
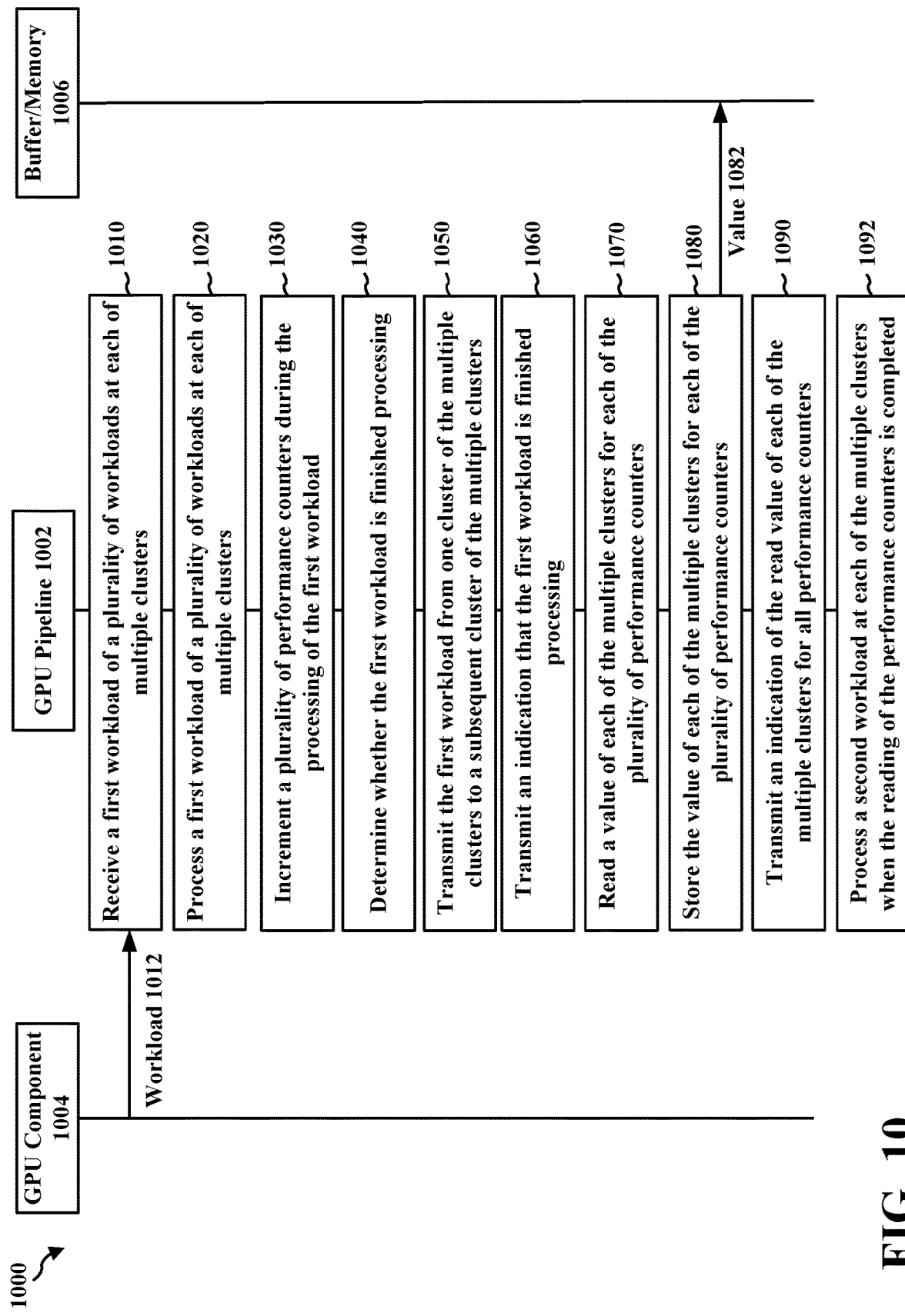
FIG. 10 is a communication flow diagram illustrating example communications between a GPU pipeline, a GPU component, and a memory/buffer in accordance with one or more techniques of this disclosure.

FIG. 10 is a communication flow diagram 1000 of graphics processing in accordance with one or more techniques of this disclosure. As shown in FIG. 10, diagram 1000 includes example communications between GPU pipeline 1002, GPU component 1004 (e.g., another component in a GPU pipeline), and buffer or memory 1006, in accordance with one or more techniques of this disclosure.

At 1010, GPU pipeline 1002 may receive a first workload of a plurality of workloads, e.g., workload 1012, at each of multiple clusters, where the first workload is processed at each of the multiple clusters after the first workload is received. In some instances, each of the plurality of workloads may correspond to one of a plurality of drawcalls.

At 1020, GPU pipeline 1002 may process a first workload of a plurality of workloads at each of multiple clusters in a graphics processing unit (GPU) pipeline. In some aspects, a plurality of components in the GPU pipeline may be allocated into the multiple clusters, where the first workload may be processed at each of the multiple clusters based on the allocation of the plurality of components into the multiple clusters. Also, a stage mode boundary marker may be implemented at each of the multiple clusters during the processing of the first workload at each of the multiple clusters.

At 1030, GPU pipeline 1002 may increment a plurality of performance counters during the processing of the first workload at each of the multiple clusters. Also, information corresponding to the incremented plurality of performance counters may be stored at a register backbone management (RBBM) component of the GPU pipeline.

At 1040, GPU pipeline 1002 may determine, at each of the multiple clusters, whether the first workload is finished processing.

At 1050, GPU pipeline 1002 may transmit, upon determining the first workload is finished processing at one cluster of the multiple clusters, the first workload from the one cluster of the multiple clusters to a subsequent cluster of the multiple clusters. The transmission of the first workload from the one cluster of the multiple clusters to the subsequent cluster of the multiple clusters may be associated with a command stream.

At 1060, GPU pipeline 1002 may transmit, upon finishing processing the first workload at each of the multiple clusters, an indication that the first workload is finished processing from each of the multiple clusters to a debug controller (DBGC).

At 1070, GPU pipeline 1002 may read, upon determining that the first workload is finished processing, a value of each of the multiple clusters for each of the plurality of performance counters.

At 1080, GPU pipeline 1002 may store, in a memory or a buffer, e.g., buffer/memory 1006, the value of each of the multiple clusters, e.g., value 1082, for each of the plurality of performance counters after reading the value of each of the multiple clusters.

At 1090, GPU pipeline 1002 may transmit an indication of the read value of each of the multiple clusters for all of the plurality of performance counters. The indication of the read value of each of the multiple clusters for all of the plurality of performance counters may be transmitted from a debug controller (DBGC) to a command processor (CP).

At 1092, GPU pipeline 1002 may process a second workload of the plurality of workloads at each of the multiple clusters when, for the first workload, the reading of the plurality of performance counters is completed for each of the multiple clusters. A subsequent workload of the plurality of workloads may be processed at each of the multiple clusters when, for a previous workload of the plurality of workloads, a reading of the plurality of performance counters is completed for each of the multiple clusters. Further, all of the plurality of workloads may be processed at each of the multiple clusters.

Figure 11:
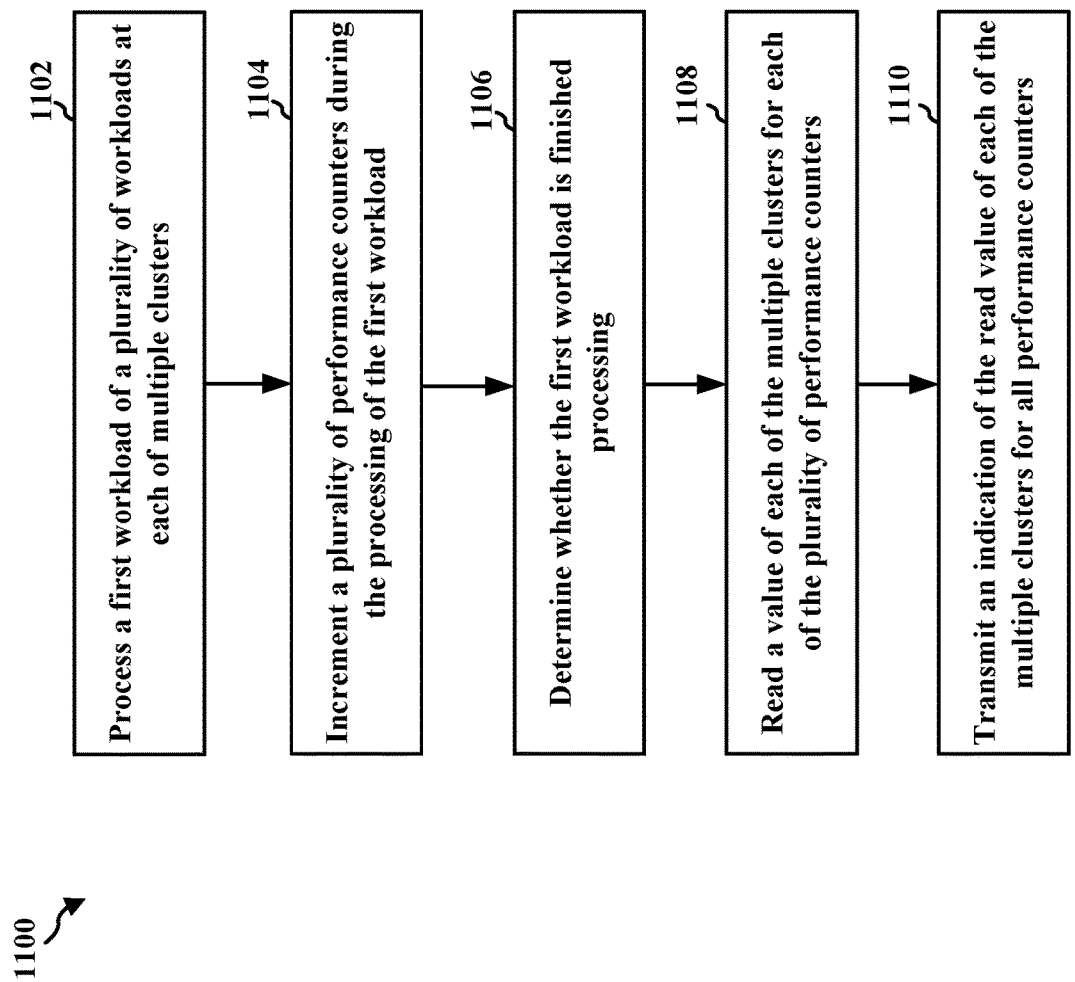
FIG. 11 is a flowchart of an example method of graphics processing in accordance with one or more techniques of this disclosure.

FIG. 11 is a flowchart 1100 of an example method of graphics processing in accordance with one or more techniques of this disclosure. The method may be performed by an apparatus, such as an apparatus for graphics processing, a GPU, another graphics processor, a GPU pipeline, a wireless communication device, and/or any apparatus that can perform graphics processing as used in connection with the examples of FIGS. 1-10.

At 1102, the apparatus may process a first workload of a plurality of workloads at each of multiple clusters in a GPU pipeline. For example, as described in 1020 of FIG. 10, GPU pipeline 1002 may process a first workload of a plurality of workloads at each of multiple clusters in a GPU pipeline. Further, processing unit 120 in FIG. 1 may perform step 1102. In some aspects, a plurality of components in the GPU pipeline may be allocated into the multiple clusters, where the first workload may be processed at each of the multiple clusters based on the allocation of the plurality of components into the multiple clusters. Also, a stage mode boundary marker may be implemented at each of the multiple clusters during the processing of the first workload at each of the multiple clusters.

At 1104, the apparatus may increment a plurality of performance counters during the processing of the first workload at each of the multiple clusters. For example, as described in 1030 of FIG. 10, GPU pipeline 1002 may increment a plurality of performance counters during the processing of the first workload at each of the multiple clusters. Further, processing unit 120 in FIG. 1 may perform step 1104. Also, information corresponding to the incremented plurality of performance counters may be stored at a register backbone management (RBBM) component of the GPU pipeline.

At 1106, the apparatus may determine, at each of the multiple clusters, whether the first workload is finished processing. For example, as described in 1040 of FIG. 10, GPU pipeline 1002 may determine, at each of the multiple clusters, whether the first workload is finished processing. Further, processing unit 120 in FIG. 1 may perform step 1106.

At 1108, the apparatus may read, upon determining that the first workload is finished processing, a value of each of the multiple clusters for each of the plurality of performance counters. For example, as described in 1070 of FIG. 10, GPU pipeline 1002 may read, upon determining that the first workload is finished processing, a value of each of the multiple clusters for each of the plurality of performance counters. Further, processing unit 120 in FIG. 1 may perform step 1108.

At 1110, the apparatus may transmit an indication of the read value of each of the multiple clusters for all of the plurality of performance counters. For example, as described in 1090 of FIG. 10, GPU pipeline 1002 may transmit an indication of the read value of each of the multiple clusters for all of the plurality of performance counters. Further, processing unit 120 in FIG. 1 may perform step 1110. The indication of the read value of each of the multiple clusters for all of the plurality of performance counters may be transmitted from a debug controller (DBGC) to a command processor (CP).

Figure 12:
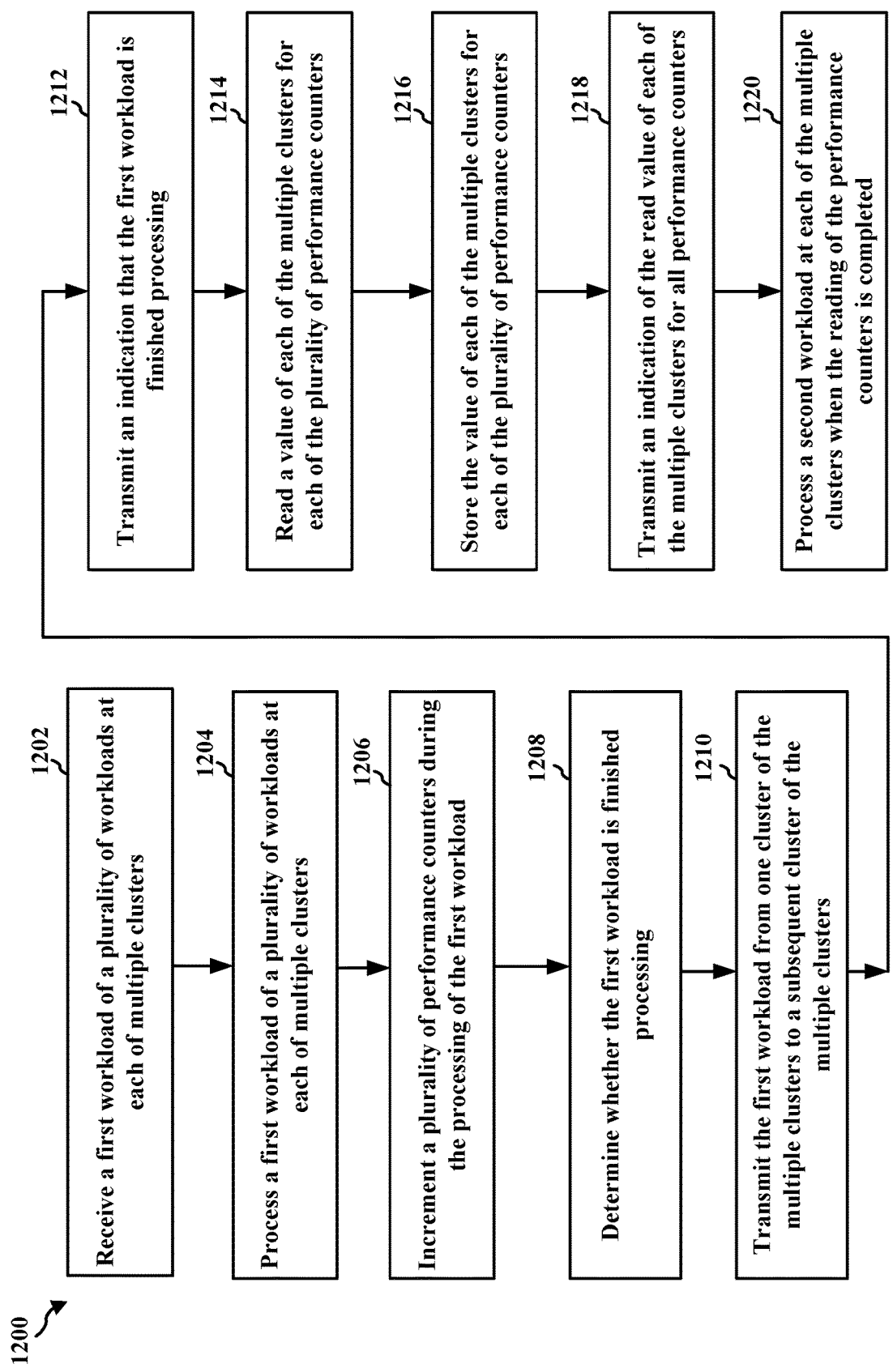
FIG. 12 is a flowchart of an example method of graphics processing in accordance with one or more techniques of this disclosure.

FIG. 12 is a flowchart 1200 of an example method of graphics processing in accordance with one or more techniques of this disclosure. The method may be performed by an apparatus, such as an apparatus for graphics processing, a GPU, another graphics processor, a GPU pipeline, a wireless communication device, and/or any apparatus that can perform graphics processing as used in connection with the examples of FIGS. 1-10.

At 1202, the apparatus may receive a first workload of a plurality of workloads at each of multiple clusters, where the first workload is processed at each of the multiple clusters after the first workload is received. For example, as described in 1010 of FIG. 10, GPU pipeline 1002 may receive the first workload of the plurality of workloads at each of the multiple clusters, where the first workload is processed at each of the multiple clusters after the first workload is received. Further, processing unit 120 in FIG. 1 may perform step 1202. In some instances, each of the plurality of workloads may correspond to one of a plurality of drawcalls.

At 1204, the apparatus may process a first workload of a plurality of workloads at each of multiple clusters in a GPU pipeline. For example, as described in 1020 of FIG. 10, GPU pipeline 1002 may process a first workload of a plurality of workloads at each of multiple clusters in a GPU pipeline. Further, processing unit 120 in FIG. 1 may perform step 1204. In some aspects, a plurality of components in the GPU pipeline may be allocated into the multiple clusters, where the first workload may be processed at each of the multiple clusters based on the allocation of the plurality of components into the multiple clusters. Also, a stage mode boundary marker may be implemented at each of the multiple clusters during the processing of the first workload at each of the multiple clusters.

At 1206, the apparatus may increment a plurality of performance counters during the processing of the first workload at each of the multiple clusters. For example, as described in 1030 of FIG. 10, GPU pipeline 1002 may increment a plurality of performance counters during the processing of the first workload at each of the multiple clusters. Further, processing unit 120 in FIG. 1 may perform step 1206. Also, information corresponding to the incremented plurality of performance counters may be stored at a register backbone management (RBBM) component of the GPU pipeline.

At 1208, the apparatus may determine, at each of the multiple clusters, whether the first workload is finished processing. For example, as described in 1040 of FIG. 10, GPU pipeline 1002 may determine, at each of the multiple clusters, whether the first workload is finished processing. Further, processing unit 120 in FIG. 1 may perform step 1208.

At 1210, the apparatus may transmit, upon determining the first workload is finished processing at one cluster of the multiple clusters, the first workload from the one cluster of the multiple clusters to a subsequent cluster of the multiple clusters. For example, as described in 1050 of FIG. 10, GPU pipeline 1002 may transmit, upon determining the first workload is finished processing at one cluster of the multiple clusters, the first workload from the one cluster of the multiple clusters to a subsequent cluster of the multiple clusters. Further, processing unit 120 in FIG. 1 may perform step 1210. The transmission of the first workload from the one cluster of the multiple clusters to the subsequent cluster of the multiple clusters may be associated with a command stream.

At 1212, the apparatus may transmit, upon finishing processing the first workload at each of the multiple clusters, an indication that the first workload is finished processing from each of the multiple clusters to a debug controller (DBGC). For example, as described in 1060 of FIG. 10, GPU pipeline 1002 may transmit, upon finishing processing the first workload at each of the multiple clusters, an indication that the first workload is finished processing from each of the multiple clusters to a debug controller (DBGC). Further, processing unit 120 in FIG. 1 may perform step 1212.

At 1214, the apparatus may read, upon determining that the first workload is finished processing, a value of each of the multiple clusters for each of the plurality of performance counters. For example, as described in 1070 of FIG. 10, GPU pipeline 1002 may read, upon determining that the first workload is finished processing, a value of each of the multiple clusters for each of the plurality of performance counters. Further, processing unit 120 in FIG. 1 may perform step 1214.

At 1216, the apparatus may store, in a memory or a buffer, the value of each of the multiple clusters for each of the plurality of performance counters after reading the value of each of the multiple clusters. For example, as described in 1080 of FIG. 10, GPU pipeline 1002 may store, in a memory or a buffer, the value of each of the multiple clusters for each of the plurality of performance counters after reading the value of each of the multiple clusters. Further, processing unit 120 in FIG. 1 may perform step 1216.

At 1218, the apparatus may transmit an indication of the read value of each of the multiple clusters for all of the plurality of performance counters. For example, as described in 1090 of FIG. 10, GPU pipeline 1002 may transmit an indication of the read value of each of the multiple clusters for all of the plurality of performance counters. Further, processing unit 120 in FIG. 1 may perform step 1218. The indication of the read value of each of the multiple clusters for all of the plurality of performance counters may be transmitted from a debug controller (DBGC) to a command processor (CP).

At 1220, the apparatus may process a second workload of the plurality of workloads at each of the multiple clusters when, for the first workload, the reading of the plurality of performance counters is completed for each of the multiple clusters. For example, as described in 1092 of FIG. 10, GPU pipeline 1002 may process a second workload of the plurality of workloads at each of the multiple clusters when, for the first workload, the reading of the plurality of performance counters is completed for each of the multiple clusters. Further, processing unit 120 in FIG. 1 may perform step 1220. A subsequent workload of the plurality of workloads may be processed at each of the multiple clusters when, for a previous workload of the plurality of workloads, a reading of the plurality of performance counters is completed for each of the multiple clusters. Further, all of the plurality of workloads may be processed at each of the multiple clusters.

In configurations, a method or an apparatus for graphics processing is provided. The apparatus may be a GPU, a graphics processor, or some other processor that may perform graphics processing. In aspects, the apparatus may be the processing unit 120 within the device 104, or may be some other hardware within the device 104 or another device. The apparatus, e.g., processing unit 120, may include means for processing a first workload of a plurality of workloads at each of multiple clusters in a graphics processing unit (GPU) pipeline; means for incrementing a plurality of performance counters during the processing of the first workload at each of the multiple clusters; means for determining, at each of the multiple clusters, whether the first workload is finished processing; means for reading, upon determining that the first workload is finished processing, a value of each of the multiple clusters for each of the plurality of performance counters; means for transmitting an indication of the read value of each of the multiple clusters for all of the plurality of performance counters; means for processing a second workload of the plurality of workloads at each of the multiple clusters when, for the first workload, the reading of the plurality of performance counters is completed for each of the multiple clusters; means for transmitting, upon determining the first workload is finished processing at one cluster of the multiple clusters, the first workload from the one cluster of the multiple clusters to a subsequent cluster of the multiple clusters; means for transmitting, upon finishing processing the first workload at each of the multiple clusters, an indication that the first workload is finished processing from each of the multiple clusters to a debug controller (DBGC); means for storing, in a memory or a buffer, the value of each of the multiple clusters for each of the plurality of performance counters after reading the value of each of the multiple clusters; and means for receiving the first workload of the plurality of workloads at each of the multiple clusters, where the first workload is processed at each of the multiple clusters after the first workload is received.

The subject matter described herein can be implemented to realize one or more benefits or advantages. For instance, the described graphics processing techniques can be used by a GPU, a graphics processor, or some other processor that can perform graphics processing to implement the performance overhead optimization techniques for GPU scoping described herein. This can also be accomplished at a low cost compared to other graphics processing techniques. Moreover, the graphics processing techniques herein can improve or speed up data processing or execution. Further, the graphics processing techniques herein can improve resource or data utilization and/or resource efficiency. Additionally, aspects of the present disclosure can utilize performance overhead optimization techniques for GPU scoping in order to improve memory bandwidth efficiency and/or increase processing speed at a GPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for graphics processing, including a memory and at least one processor coupled to the memory and configured to: process a first workload of a plurality of workloads at each of multiple clusters in a graphics processing unit (GPU) pipeline; increment a plurality of performance counters during the processing of the first workload at each of the multiple clusters; determine, at each of the multiple clusters, whether the first workload is finished processing; read, upon determining that the first workload is finished processing, a value of each of the multiple clusters for each of the plurality of performance counters; and transmit an indication of the read value of each of the multiple clusters for all of the plurality of performance counters.

Aspect 2 is the apparatus of aspect 1, where the at least one processor is further configured to: process a second workload of the plurality of workloads at each of the multiple clusters when, for the first workload, the reading of the plurality of performance counters is completed for each of the multiple clusters.

Aspect 3 is the apparatus of any of aspects 1 and 2, where a subsequent workload of the plurality of workloads is processed at each of the multiple clusters when, for a previous workload of the plurality of workloads, a reading of the plurality of performance counters is completed for each of the multiple clusters.

Aspect 4 is the apparatus of any of aspects 1 to 3, where all of the plurality of workloads are processed at each of the multiple clusters.

Aspect 5 is the apparatus of any of aspects 1 to 4, where the at least one processor is further configured to: transmit, upon determining the first workload is finished processing at one cluster of the multiple clusters, the first workload from the one cluster of the multiple clusters to a subsequent cluster of the multiple clusters.

Aspect 6 is the method of any of aspects 1 to 5, where the transmission of the first workload from the one cluster of the multiple clusters to the subsequent cluster of the multiple clusters is associated with a command stream.

Aspect 7 is the method of any of aspects 1 to 6, where a stage mode boundary marker is implemented at each of the multiple clusters during the processing of the first workload at each of the multiple clusters.

Aspect 8 is the method of any of aspects 1 to 7, where the at least one processor is further configured to: transmit, upon finishing processing the first workload at each of the multiple clusters, an indication that the first workload is finished processing from each of the multiple clusters to a debug controller (DBGC).

Aspect 9 is the method of any of aspects 1 to 8, where information corresponding to the incremented plurality of performance counters is stored at a register backbone management (RBBM) component of the GPU pipeline.

Aspect 10 is the method of any of aspects 1 to 9, where the at least one processor is further configured to: store, in a memory or a buffer, the value of each of the multiple clusters for each of the plurality of performance counters after reading the value of each of the multiple clusters.

Aspect 11 is the method of any of aspects 1 to 10, where the indication of the read value of each of the multiple clusters for all of the plurality of performance counters is transmitted from a debug controller (DBGC) to a command processor (CP).

Aspect 12 is the method of any of aspects 1 to 11, where a plurality of components in the GPU pipeline are allocated into the multiple clusters, where the first workload is processed at each of the multiple clusters based on the allocation of the plurality of components into the multiple clusters.

Aspect 13 is the method of any of aspects 1 to 12, where the at least one processor is further configured to: receive the first workload of the plurality of workloads at each of the multiple clusters, where the first workload is processed at each of the multiple clusters after the first workload is received.

Aspect 14 is the method of any of aspects 1 to 13, where each of the plurality of workloads correspond to one of a plurality of drawcalls.

Aspect 15 is the method of any of aspects 1 to 14, further including a transceiver coupled to the at least one processor.

Aspect 16 is a method of graphics processing for implementing any of aspects 1 to 15.

Aspect 17 is an apparatus for graphics processing including means for implementing any of aspects 1 to 15.

Aspect 18 is a computer-readable medium storing computer executable code, the code when executed by at least one processor causes the at least one processor to implement any of aspects 1 to 15.

What is claimed is:

1. An apparatus for graphics processing, comprising:
a memory; and
at least one processor coupled to the memory and configured to:
capture a plurality of performance counters at each stage of a graphics processing unit (GPU) pipeline;
process a first workload of a plurality of workloads at each of multiple clusters in the GPU pipeline;
increment the plurality of performance counters during the processing of the first workload at each of the multiple clusters;
determine, at each of the multiple clusters, whether the first workload is finished processing;

scope the GPU pipeline by reading, upon determining that the first workload is finished processing, a value of each of the multiple clusters for each of the plurality of performance counters at defined workload boundaries;

transmit an indication of the read value of each of the multiple clusters for all of the plurality of performance counters; and process a second workload of the plurality of workloads at each of the multiple clusters when, for the first workload, the reading of the plurality of performance counters is completed for each of the multiple clusters, wherein the scoping the GPU pipeline by reading the value of each of the multiple clusters for each of the plurality of performance counters provides accurate capturing of the performance counters without any mixing or modifying of the workloads while allowing multiple workloads to be present in the GPU pipeline at a time and capturing the performance counters at the defined workload boundaries.

2. The apparatus of claim 1, wherein a subsequent workload of the plurality of workloads is processed at each of the multiple clusters when, for a previous workload of the plurality of workloads, a reading of the plurality of performance counters is completed for each of the multiple clusters.

3. The apparatus of claim 1, wherein all of the plurality of workloads are processed at each of the multiple clusters.

4. The apparatus of claim 1, wherein the at least one processor is further configured to:

transmit, upon determining the first workload is finished processing at one cluster of the multiple clusters, the first workload from the one cluster of the multiple clusters to a subsequent cluster of the multiple clusters.

5. The apparatus of claim 4, wherein the transmission of the first workload from the one cluster of the multiple clusters to the subsequent cluster of the multiple clusters is associated with a command stream without any wait-for-idle (WFI) mechanisms.

6. The apparatus of claim 1, wherein a stage mode boundary marker is implemented at each of the multiple clusters during the processing of the first workload at each of the multiple clusters.

7. The apparatus of claim 1, wherein the at least one processor is further configured to:

store, in a memory or a buffer, the value of each of the multiple clusters for each of the plurality of performance counters after reading the value of each of the multiple clusters.

8. The apparatus of claim 1, wherein the indication of the read value of each of the multiple clusters for all of the plurality of performance counters is transmitted from a debug controller (DBGC) to a command processor (CP).

9. The apparatus of claim 1, wherein a plurality of components in the GPU pipeline are allocated into the multiple clusters, wherein the first workload is processed at each of the multiple clusters based on the allocation of the plurality of components into the multiple clusters.

10. The apparatus of claim 1, wherein the at least one processor is further configured to:

receive the first workload of the plurality of workloads at each of the multiple clusters, wherein the first workload is processed at each of the multiple clusters after the first workload is received.

11. The apparatus of claim 1, wherein each of the plurality of workloads correspond to one of a plurality of drawcalls.

12. The apparatus of claim 1, further comprising a transceiver coupled to the at least one processor.

13. The apparatus of claim 1, wherein the at least one processor is further configured to:

transmit, upon finishing processing the first workload at each of the multiple clusters, an indication that the first workload is finished processing from each of the multiple clusters to a debug controller (DBGC), wherein information corresponding to the incremented plurality of performance counters is stored at a register backbone management (RBBM) component of the GPU pipeline.

14. A method of graphics processing, comprising:

capturing a plurality of performance counters at each stage of a graphics processing unit (GPU) pipeline;

processing a first workload of a plurality of workloads at each of multiple clusters in the GPU pipeline;

incrementing the plurality of performance counters during the processing of the first workload at each of the multiple clusters;

determining, at each of the multiple clusters, whether the first workload is finished processing;

scoping the GPU pipeline by reading, upon determining that the first workload is finished processing, a value of each of the multiple clusters for each of the plurality of performance counters at defined workload boundaries;

transmitting an indication of the read value of each of the multiple clusters for all of the plurality of performance counters;

processing a second workload of the plurality of workloads at each of the multiple clusters when, for the first workload, the reading of the plurality of performance counters is completed for each of the multiple clusters, wherein the scoping the GPU pipeline by reading the value of each of the multiple clusters for each of the plurality of performance counters provides accurate capturing of the performance counters without any mixing or modifying of the workloads while allowing multiple workloads to be present in the GPU pipeline at a time and capturing the performance counters at the defined workload boundaries.

15. The method of claim 14, wherein a subsequent workload of the plurality of workloads is processed at each of the multiple clusters when, for a previous workload of the plurality of workloads, a reading of the plurality of performance counters is completed for each of the multiple clusters.

16. The method of claim 14, wherein all of the plurality of workloads are processed at each of the multiple clusters.

17. The method of claim 14, further comprising:

transmitting, upon determining the first workload is finished processing at one cluster of the multiple clusters, the first workload from the one cluster of the multiple clusters to a subsequent cluster of the multiple clusters.

18. The method of claim 17, wherein the transmission of the first workload from the one cluster of the multiple clusters to the subsequent cluster of the multiple clusters is associated with a command stream without any wait-for-idle (WFI) mechanisms.

19. The method of claim 14, wherein a stage mode boundary marker is implemented at each of the multiple clusters during the processing of the first workload at each of the multiple clusters.

20. The method of claim 14, further comprising:
storing, in a memory or a buffer, the value of each of the multiple clusters for each of the plurality of performance counters after reading the value of each of the multiple clusters.

21. The method of claim 14, wherein the indication of the read value of each of the multiple clusters for all of the plurality of performance counters is transmitted from a debug controller (DBGC) to a command processor (CP).

22. The method of claim 14, wherein a plurality of components in the GPU pipeline are allocated into the multiple clusters, wherein the first workload is processed at each of the multiple clusters based on the allocation of the plurality of components into the multiple clusters.

23. The method of claim 14, further comprising:
receiving the first workload of the plurality of workloads at each of the multiple clusters, wherein the first workload is processed at each of the multiple clusters after the first workload is received.

24. The method of claim 14, further comprising:
transmitting, upon finishing processing the first workload at each of the multiple clusters, an indication that the first workload is finished processing from each of the multiple clusters to a debug controller (DBGC),
wherein information corresponding to the incremented plurality of performance counters is stored at a register backbone management (RBBM) component of the GPU pipeline.

25. An apparatus for graphics processing, comprising:
means for capturing a plurality of performance counters at each stage of a graphics processing unit (GPU) pipeline;
means for processing a first workload of a plurality of workloads at each of multiple clusters in the GPU pipeline;
means for incrementing the plurality of performance counters during the processing of the first workload at each of the multiple clusters;
means for determining, at each of the multiple clusters, whether the first workload is finished processing;
means for scoping the GPU pipeline by reading, upon determining that the first workload is finished processing, a value of each of the multiple clusters for each of the plurality of performance counters at defined workload boundaries;
means for transmitting an indication of the read value of each of the multiple clusters for all of the plurality of performance counters;
means for processing a second workload of the plurality of workloads at each of the multiple clusters when, for the first workload, the reading of the plurality of performance counters is completed for each of the multiple clusters; and
means for transmitting, upon finishing processing the first workload at each of the multiple clusters, an indication that the first workload is finished processing from each of the multiple clusters to a debug controller (DBGC),
wherein information corresponding to the incremented plurality of performance counters is stored at a register backbone management (RBBM) component of the GPU pipeline, and
wherein the means for scoping the GPU pipeline by reading the value of each of the multiple clusters for each of the plurality of performance counters provides accurate capturing of the performance counters without any mixing or modifying of the workloads while allowing multiple workloads to be present in the GPU pipeline at a time and capturing the performance counters at the defined workload boundaries.

26. A non-transitory computer-readable medium storing computer executable code for graphics processing, the code when executed by a processor causes the processor to:
capture a plurality of performance counters at each stage of a graphics processing unit (GPU) pipeline;
process a first workload of a plurality of workloads at each of multiple clusters in the GPU pipeline;
increment the plurality of performance counters during the processing of the first workload at each of the multiple clusters;
determine, at each of the multiple clusters, whether the first workload is finished processing;
scope the GPU pipeline by reading, upon determining that the first workload is finished processing, a value of each of the multiple clusters for each of the plurality of performance counters at defined workload boundaries;
transmit an indication of the read value of each of the multiple clusters for all of the plurality of performance counters;
process a second workload of the plurality of workloads at each of the multiple clusters when, for the first workload, the reading of the plurality of performance counters is completed for each of the multiple clusters; and
transmit, upon finishing processing the first workload at each of the multiple clusters, an indication that the first workload is finished processing from each of the multiple clusters to a debug controller (DBGC),
wherein information corresponding to the incremented plurality of performance counters is stored at a register backbone management (RBBM) component of the GPU pipeline, and
wherein the scoping the GPU pipeline by reading the value of each of the multiple clusters for each of the plurality of performance counters provides accurate capturing of the performance counters without any mixing or modifying of the workloads while allowing multiple workloads to be present in the GPU pipeline at a time and capturing the performance counters at the defined workload boundaries.

* * * * *